April 8, 1941. N. H. SAUNDERS Re. 21,768

TELEPHONE SYSTEM

Original Filed June 8, 1932 3 Sheets-Sheet 1

Inventor
Norman H. Saunders
C. R. Sykes
Atty.

April 8, 1941. N. H. SAUNDERS Re. 21,768

TELEPHONE SYSTEM

Original Filed June 8, 1932 3 Sheets-Sheet 2

Inventor
Norman H. Saunders
C. R. Sigar
Atty.

April 8, 1941. N. H. SAUNDERS Re. 21,768

TELEPHONE SYSTEM

Original Filed June 8, 1932 3 Sheets-Sheet 3

Inventor
Norman H. Saunders
C. R. Sykes
Atty.

Reissued Apr. 8, 1941

Re. 21,768

UNITED STATES PATENT OFFICE 21,768

TELEPHONE SYSTEM

Norman H. Saunders, Chicago, Ill., assignor, by mesne assignments, to Associated Electric Laboratories, Inc., Chicago, Ill., a corporation of Delaware Original No. 1,971,505, dated August 28, 1934, Serial No. 615,970, June 8, 1932. Application for reissue June 5, 1940, Serial No. 338,999

41 Claims. (Cl. 179—18)

This invention relates to telephone systems in general and particularly to telephone systems in which connections are completed through the medium of automatic switches. The object of the invention is to improve the switching apparatus required for the establishment of local and toll connections in such systems.

*General description*

The switch train to which the improved features of the invention have been applied include toll selectors and combination local and toll connectors. These switches are adapted to cooperate with other well known switching apparatus and to constitute therewith a complete automatic telephone exchange system.

The toll selectors have been improved by the introduction of a more efficient and reliable testing circuit wherein a polarized relay tests for a definite potential to indicate an idle trunk. Another feature is the arrangement for registering the number of calls attempted to trunk groups in which all trunks are engaged. A further feature is the arrangement for switching over from the primary to the secondary operating stage.

The connectors have been improved by the introduction of a more reliable testing circuit for determining the idle or busy condition of the called lines. Another feature is the improved wiper-selecting arrangement for determining which one of two sets of wipers is to be used in a connection. Another feature is the arrangement for switching over from one operating stage to the succeeding operating stage. Another feature is the arrangement which permits the ground conection to the battery-feed relay to be kept open when the connectors are not in use, thereby preventing electrolytic action in the relay winding. A further feature is the arrangement for controlling the supervisory signals according to the class of connection extended over a connector.

While the various features above discussed have been illustrated in conection with specific types of switches, it will be appreciated that certain of these features have a much wider application. The scope of the invention accordingly is not limited by the particular embodiment in which it has been shown, but is defined in the appended claims.

*Description of drawings*

The accompanying drawings comprising Figs. 1 to 3, inclusive, show sufficient circuits of a system embodying the invention to permit the same to be readily explained and understood.

Referring now to Fig. 1 there is shown the calling end of an ordinary cord circuit C. The cord circuit of which only a part is shown may be of any suitable type provided with a polarized relay for controlling the supervisory signals. The cord is provided with a plug P for connecting the same with trunks extending to transmission selectors, such as the selector TS, at the automatic exchange. The selector TS which is a two-motion Strowger switch, has access to trunks extending to toll-intermediate selectors of which the selector IS has been shown. Both of the toll selectors are provided with testing relays of the type disclosed in Pye Patent No. 1,673,884, granted June 19, 1928. The characteristics of these relays are clearly described in the patent and will be discussed in detail hereinafter. The intermediate selector IS and other similar selectors have access, together with the local selectors of the automatic office, to trunks extending to combination local and toll connectors, such as those shown in Figs. 2 and 3.

Figure 2:
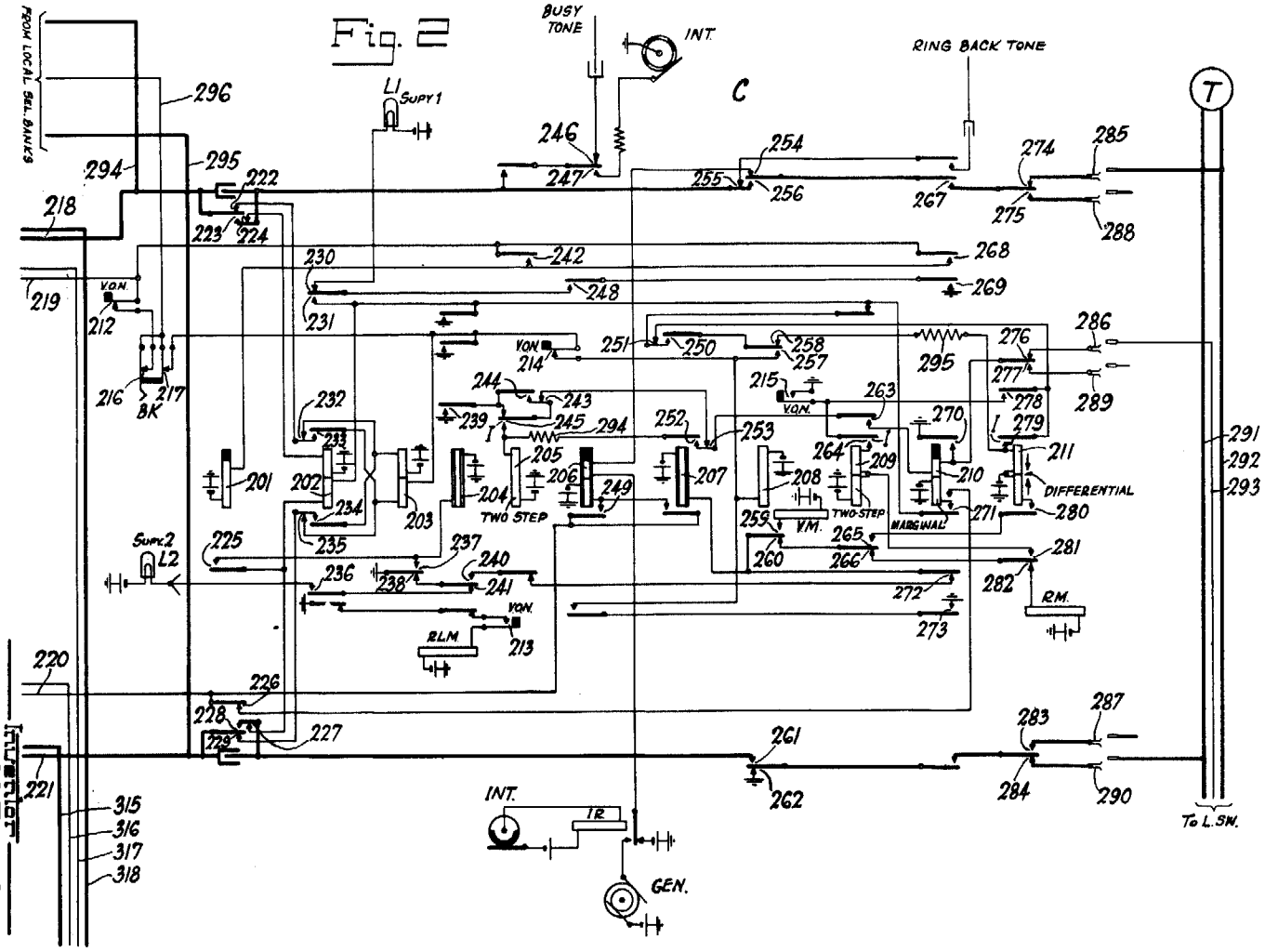
Fig. 2 shows a combination local and toll connector C for extending connections to individual lines.

Connector C shown in Fig. 2 is accessible over the two branches of the incoming toll-intermediate selectors, local selectors, respectively. The operating characteristics of the switch are determined by the route over which a connection is extended thereto. The switch is equipped with two separate sets of wipers and accordingly has access to two hundred different subscribers' lines. Wiper selection is controlled by relays in the switch which respond to impulses dialled by a calling subscriber or operator.

Figure 3:
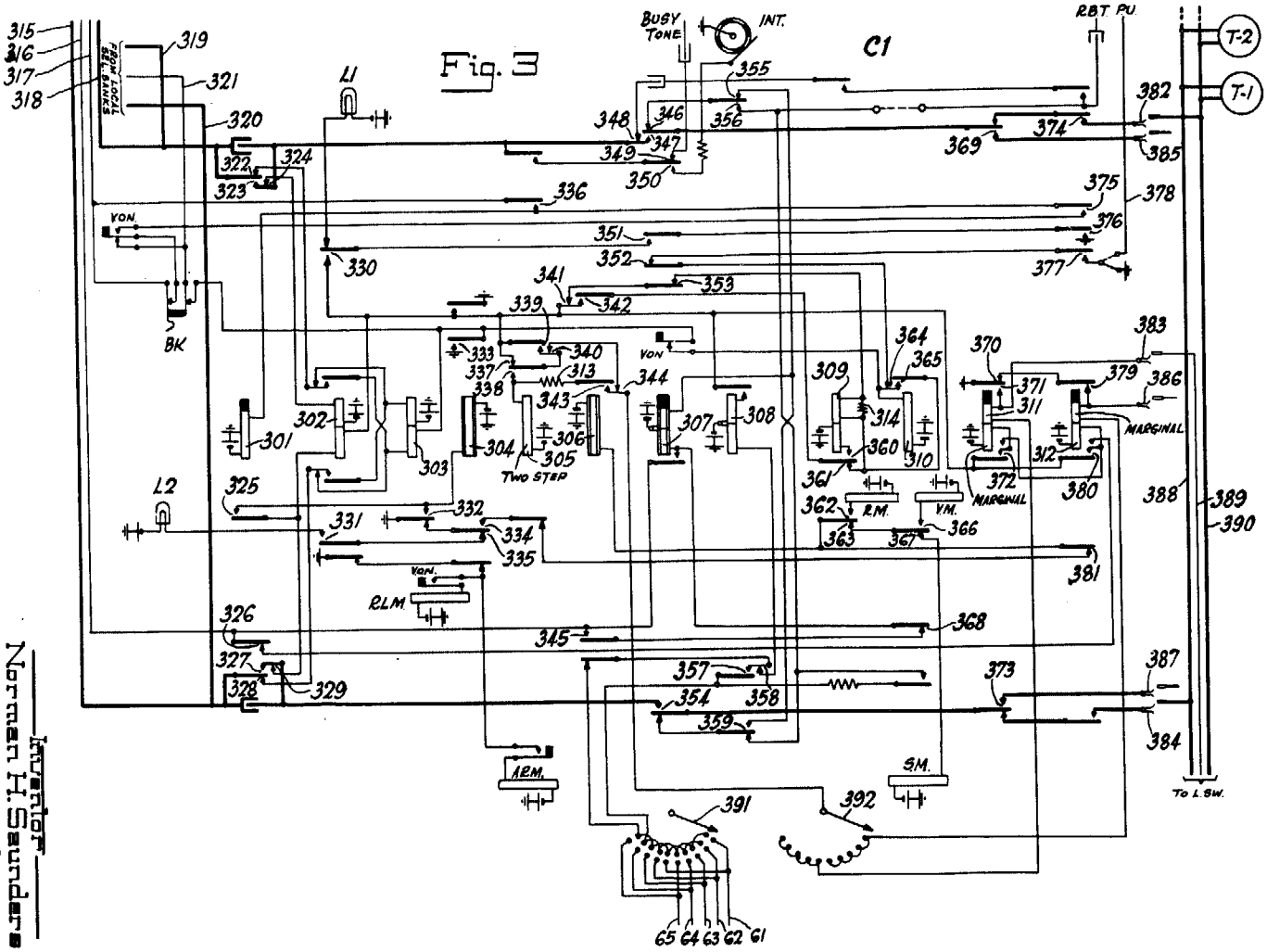
Fig. 3 shows a combination local and toll connector C1 for extending connections to party lines.

In Fig. 3, there is shown a combination local and toll party line connector C1, which is accessible to toll selectors and local selectors over separate branches of the incoming trunk, respectively. This switch also operates as a local or a toll switch, depending on the route over which a connection is extended thereto. The switch is provided with two separate sets of wipers which give it access to two hundred different party lines. Wiper selection as well as ringing current selection is made by means of an auxiliary switch associated with the connector.

*Detailed description*

The operations involved in establishing various types of connections over the circuits illustrated in the drawings will now be described in detail to more clearly bring out the novel features of the invention.

*Initiation of a toll call*

It will be assumed for the purpose of this description that the toll operator has received a toll call for the subscriber at substation T (Fig. 2), and that she has selected the cord circuit C for extending the connection. The plug P is then inserted into the jack J of an idle trunk, such as the trunk comprising conductors 3 and 4, which terminates in transmission selector TS. Line relay 11 of the transmission selector is energized over a circuit which may be traced from battery, upper winding of the relay, vertical off-normal contacts 16, contacts 29 and 28, resistance, lower left-hand winding of repeating coil R, trunk conductor 4, tip contacts of the jack and plug, upper normally closed contacts of the key K, winding of polarized relay 1, lower contacts of the key K, ring contacts of the plug and jack, trunk conductor 3, upper left-hand winding of repeating coil R, through the resistance and contacts 21 to ground. Relay 1 does not operate at this time due to the direction of current flow in its winding. Relay 11 on operating completes an obvious circuit for relay 12 at contacts 40. Relay 12, which is provided with a copper sleeve to make it slow-releasing, operates, short-circuits off-normal contacts 16 at its upper contacts, prepares the impulsing circuit at contacts 42, prepares the test circuit at contacts 44, and at contacts 45 completes circuits for the lower winding of relays 5 and 14. The circuit of relay 5 includes contacts 54, eleventh position contacts RC, and contacts 26 and the lower winding of the relay. Relay 13 whose upper winding is connected in parallel with relay 12 by way of contacts 52 and vertical off-normal contacts 17, operates and prepares a circuit for its lower winding and the vertical magnet in parallel at contacts 49. Relay 5 operates over the circuit above traced and opens a point in the circuit of relay 6 at its upper contacts. The transmission selector is now ready to respond to impulses from the operator's calling device.

*Setting the selectors*

The calling operator now operates key K to the right, thereby bridging the calling device CD across the trunk conductors in place of the polarized relay 1. The operator then dials the first digit of the called number, interrupting the circuit of line relay 11 at interrupter contacts 2 of the calling device CD. Relay 11 responds in the usual way and transmits a corresponding series of impulses by way of contacts 41, 42, and 49 to vertical magnet VM and the lower winding of relay 13. The vertical magnet raises the wipers step-by-step to the called level. The off-normal contacts VON operate on the first vertical step of the wipers and the original energizing circuit of relay 13 is opened at contacts 17. Relay 13 is slow releasing, however, and the impulses received by the lower winding maintain the relay operated throughout the series of impulses. It will also be noted that the original energizing circuit of relay 11 is opened at off-normal contacts 16, however, a new circuit for the relay is maintained over the upper contacts of the relay 12.

Shortly after the last impulse of the series, relay 13 releases and completes a circuit for the rotary magnet RM by way of contacts 40, contacts 52, vertical off-normal contacts 16, contacts 48, and interrupter contacts 62. The rotary magnet energizes and steps the wipers in on the first set of contacts in the called level. The selector now tests for the idle or busy condition of the trunk terminating in this set of contacts. As previously stated, the lower winding of relay 14 was energized when relay 12 operated. Relay 14 does not operate over its lower winding alone and requires a specific potential on its upper winding to bring about its energization. This potential in the present instance is battery through the low-resistance winding of a relay in the switch ahead. Assuming that the trunk is busy either due to the prior seizure by another switch or due to the operation of the busy key of the switch associated with the trunk which opens the test circuit, relay 14 will find no operating potential and consequently will not operate. The rotary magnet, upon energizing as described, opened its own circuit at contacts 62 and, upon deenergizing it again closes its circuit so that it now reoperates and advances the wipers a second step. This buzzer-like action continues until an idle trunk is found, which, for example, may be the trunk comprising conductors 63—66 terminating in intermediate selector IS. When the wipers engage the contacts terminating this trunk a circuit is completed from battery through the low resistance upper winding of relay 74, vertical off-normal contacts 69, busy-key contacts BK, release trunk conductor 64, test contact and wiper 59, upper winding of polarized relay 14 and contacts 44 to ground. Relay 14 operates very quickly under these conditions and opens the rotary magnet circuit at contacts 52. Direct ground is applied to the test wiper by way of contacts 53 and the two windings of the relay are connected in series and a control circuit is extended from the transmission selector to the intermediate selector.

In the selector IS relay 74 operates from ground on the release trunk and prepares various circuits including a circuit for its own lower winding and vertical magnet VM in parallel at contacts 80. A circuit is also completed for line relay 72 of selector IS which may be traced from battery, upper winding of the relay, eleventh position rotary contacts 67, contacts 85, trunk conductor 63, wiper 58 of transmission selector TS, upper contacts of relays 14 and 11, contacts 32, upper right-hand winding of repeating coil R, contacts 23, upper winding of relay 5, lower right-hand winding of repeating coil R, contacts 39 and 56, wiper 61, trunk conductor 66, contacts 92, lower winding of relay 72, contacts 83 and 89 to ground. The initial energizing circuit of relay 5 was opened at contacts 54 upon the operation of relay 14 and the relay is now energized in series with relay 72 of selector IS. Relay 72 operates in series with the upper winding of relay 5 and completes an obvious circuit for relay 73 at contacts 76. Relay 73 operates, applies ground to release-trunk conductor 64 at its upper contacts, prepares the impulsing circuit at contacts 78 and completes a circuit for the lower winding of polarized relay 75 at its lower contacts. Relay 75 does not operate at this time.

The operator now dials the second digit of the called number and relay 11 responds as in the previous instance. The loop circuit previously traced for the impulse relay of the intermediate selector is interrupted at the upper contacts of relay 11 and the impulse relay responds accordingly. The circuit of relay 5 is also opened for each impulse but this relay does not restore during the impulsing as it is slow-releasing due to the copper sleeve and copper slug on its core. Relay 72 responds to the impulses and transmits a corresponding series of impulses by way of contacts 89, 77, 78, and 80 to vertical magnet VM, and the lower winding of slow-releasing relay 74. The vertical magnet raises the wipers to the level indicated by the series of impulses. Relay 74 remains energized throughout the series of impulses due to the impulses received by its lower winding although its initial energizing circuit is opened at vertical off-normal contacts 69 when the wipers leave normal position. Shortly after the last impulse of the series, relay 74 restores and completes the circuit of the rotary magnet at its upper contacts. The rotary magnet energizes, steps the wipers in on the first set of the contacts of the called level, and interrupts its own circuit at its interrupter contacts. The selector tests for an idle trunk in exactly the same manner as described for the transmission selector, and when such trunk is found, polarized relay 75 energizes and opens the rotary magnet circuit at contacts 89. Impulse relay 72 is disconnected from the loop at contacts 85 and 92 and the loop is extended by way of contacts 86 and 91 and wipers 93 and 96 to the line relay of the succeeding switch. The upper winding of relay 75 is short-circuited at contacts 87 and the control conductor is connected by way of contacts 90 to wiper 95.

Assume for example that the trunk selected is the trunk comprising conductors 218—221 terminating in connector C (Fig. 2). The control loop of the transmission selector is extended over the upper and lower wipers of the intermediate selector and thence over trunk conductors 218 and 221, contacts 222, 229, 232, and 235 to the upper and lower winding of relay 203. The upper winding of relay 203 has battery normally connected thereto. The lower winding of this relay is connected to the release trunk conductor of the switch to which ground is now connected by way of busying key contacts 217 and 216, vertical off-normal contacts 212, test conductor 219, test wiper 94 of switch IS, contacts 87 and the upper contacts of relay 73. Relay 203 operates in the above circuit and completes a circuit for relay 204 at contacts 237. The ground on the release trunk also energizes relay 208 which prepares a holding circuit for itself and connects vertical magnet VM to the impulse circuit of the connector. Relay 204 operates and connects ground directly to the lower winding of relay 203 at its upper contacts, prepares the impulsing circuit at contacts 240 and opens the release magnet circuit at its lower contacts.

*Setting connector C*

The operator now dials the third digit of the called number and relay 11 of the transmission switch selector repeats these impulses to relay 203 of the connector. Relay 203 in turn transmits impulses by way of contacts 238, 240, lower contacts of relay 206, contacts 272 and 259, winding of the vertical magnet to battery. The vertical magnet responds to the impulses and raises the wipers step-by-step to the called level. Relay 207, which is connected in parallel with the magnet operates in response to the first impulse and remains operated throughout the series of impulses. Relay 207 by closing contacts 250 completes a circuit for maintaining relay 208 energized when its original energizing circuit is opened at off-normal contacts 214. Relay 207 also completes a circuit for the lower winding of relay 206 by closing its lower contacts. The circuit for relay 206 includes control conductor 220 of the trunk, wiper 95 of intermediate selector IS, contacts 90, trunk conductor 65, wiper 60 of transmission selector TS, contacts 55, and ground at contacts 38. Relay 206 operates, completes a locking circuit for itself at contacts 249, prepares a new circuit for relay 208 at its lower contacts, and prepares a circuit for the supervisory lamp L1 at contacts 248.

Shortly after the last impulse of the series relay 207 restores and opens the holding circuit of relay 208. Relay 208 restores and prepares the rotary magnet circuit at contacts 260. The operator now dials the fourth digit of the called number and the impulses are repeated as before to relay 203. Each time relay 203 restores an impulse is transmitted over the previously traced impulse circuit which has now been extended by way of contacts 260, 266, and 282 to rotary magnet RM. Relay 207 again energizes and remains energized throughout the series of impulses and at this time completes a circuit by way of contacts 250 and 258, resistance 295, upper winding of marginal and differential relay 211 to battery. Relay 211 when energized over its upper winding in series with resistance 295 energizes only partially and closes contacts 279 which are designated by the Roman numeral I. The closure of these latter contacts prepares a circuit for operating the relay fully upon the release of relay 207 as will be explained subsequently. The rotary magnet responds to the impulses transmitted by relay 203 and rotates the wiper step-by-step to the bank position in which the contacts of the called line are accessible.

Shortly after the last impulse of the series transmitted to the rotary magnet, relay 207 will restore and complete the circuit for energizing relay 211 in its second step. This relay upon energizing completely locks by way of contacts 279 and 278 and vertical off-normal contacts 215. The impulsing circuit previously traced to the rotary magnet is switched over at contacts 281 to two-step relay 209. The lower set of wipers, that is, wipers 287—289, are connected up at contacts 275, 277, and 283. Further, a circuit is prepared for the lower winding of relay 211 at contacts 280. The connector is provided with two separate sets of wipers and two different lines are accessible in each bank position. The particular one of these lines to be selected will depend upon the last digit dialled by the calling operator. The final digit of the number may be either the digit 1 or the digit 2, depending on the set of wipers required. Assume first that the digit 1 is dialled and repeated by the transmission selector to relay 203. Relay 203 on releasing completes a circuit from ground, contacts 238 and 240, lower contacts of relay 205, contacts 272, 260, 266, and 281, lower winding of relay 209 to battery. Relay 209 operates only in its first step, thereby preparing a circuit for both windings in series at contacts 264. At the termination of the impulse, relay 203 operates and removes ground from the impulse circuit and relay 209 operates in its second step over its two windings in series. The original operating circuit of relay 211 is opened at the upper contacts of relay 209, a point in the test circuit is closed at contacts 263, and the impulse circuit is transferred by way of contacts 265 and 280 to the lower winding of relay 211. In case no further impulses are transmitted, as will be the case in the present instance, the connector will test over the lower test wiper as will be explained subsequently.

In case the last digit of the number had been the digit 2, a second impulse would be transmitted over the impulse circuit to energize the lower winding of relay 211. The two windings of this relay are differentially wound, that is, they oppose each other and consequently the result of the second impulse is to restore relay 211 to normal position. The relay on releasing opens the circuits of both of its windings and remains normal regardless of any subsequent impulses which may be transmitted. The set of wipers comprising wipers 285, 286, and 290 is connected up and the test proceeds in the same manner as over the other set of wipers.

Relay 207 energizes during the transmission of the last impulse or series of impulses as previously explained and prepares the test circuit. After the dialling of the final digit and before the release of relay 207 which is slow releasing, test relay 205 is connected by way of resistance 294, contacts 252 and 263, upper winding of relay 210, and either of contacts 276 or 277 to test wiper 286 or 289. Assuming that the called line is busy when the connection is extended there will be ground on the test contact encountered by the active test wiper and relay 205 will partially energize. Under these conditions relay 205 closes only contacts 245, thereby preparing a circuit for operating the relay fully upon the release of relay 207. The resistance of relay 205 is such that relay 210, is not operated. When relay 207 restores after a slight delay, a circuit is completed by way of contacts 245, 243, and 253 for operating relay 205 fully and the relay locks by way of contacts 245 and 244, to ground at contacts 239. The busy signalling circuit is closed at the upper contacts of the relay, a circuit is completed at contacts 242 for relay 201, and the impulsing circuit is opened at the lower contacts of the relay. Relay 201 operates, disconnects relay 203 from the control loop at contacts 222 and 229 and connects the loop through to the talking conductors of the connector at contacts 223 and 228. Battery feed relay 202 is disconnected from the talking conductors of the switch at contacts 224 and 227. A circuit is prepared for relay 204 and the lower winding of the relay 202 at contacts 225 and the local holding circuit of relay 206 is opened at contacts 226.

The disconnection of relay 203 from the control loop opens the holding circuit of the relay 5 of transmission selector TS and that relay restores. Relay 5 completes an obvious circuit for relay 6 which operates and by opening contacts 21 and 28 and closing contacts 20 and 27 reverses the battery and ground connections to the incoming trunk by reversing the connection of relay 11 with respect to the trunk conductor. Relay 6 disconnects the upper winding of relay 5 from the control loop and connects the two windings of battery-feed relay 7 thereto. Referring now to the connector, ground is intermittently applied to the upper talking conductor by way of the busy tone interrupter, contacts 247, upper contacts of relay 205, contacts 223, conductor 218, wiper 93 of switch IS, contacts 86, conductor 63, wiper 58 of switch TS, upper contacts of relays 14 and 11, contacts 32, upper right-hand winding of repeating coil R, contacts 24, upper winding of relay 7 to battery. Relay 7 operates intermittently and on each operation completes an obvious circuit for relay 8. Relay 8 operates intermittently to disconnect relay 11 from the incoming trunk by opening contacts 29 and 31. The release of the connection is prevented by the closure of a holding circuit across the two windings of relay 11 by way of contacts 30 of relay 8. In the operator's cord circuit polarized relay 1 operates in response to the reversal of battery which takes place upon the operation of relay 6. The intermittent disconnection of relay 11 from the trunk conductors causes the polarized relay to energize and deenergize and thereby light the supervisory lamp intermittently. This gives the calling operator a distinctive visual signal indicating that the called line is busy. The operator is then expected to release the connection as will be explained subsequently.

Assuming that the called line is idle when a connection is extended thereto as described above, the following operations take place. An idle line is characterized by the presence of battery potential on the test contact, the battery being normally connected thereto through the winding of the cut-off relay of the lineswitch. After the dialling of the last digit of the called number the test circuit including busy test relay 205 will be completed as before described. The test relay does not operate due to the battery potential encountered by the test wiper. When relay 207 restores shortly after the last impulse of the series, the test circuit is switched from battery through relay 205 to ground at contacts 239, and relay 210 operates in series with the cut-off relay of the subscriber's lineswitch. Relay 210 completes the ring-back-tone circuit at its upper contacts, prepares the ringing circuit at contacts 267 and its lower contacts, completes a circuit for relay 201 at contacts 268, prepares the circuit for supervisory lamp L1 at contacts 269, applies ground directly to the test wiper at contacts 270, completes a locking circuit for itself at contacts 271, opens the impulsing circuit at contacts 272, and completes the circuit of relay 208 at contacts 273. Relay 201 operates to connect the lower winding of relay 202 and relay 204 in series and to disconnect relay 203 from the line as was described for a call to a busy line. Relay 208 operates and opens the ringing circuit at contacts 254 and 262, thereby placing the signalling of the called subscriber under control of the calling operator. The disconnection of relay 203 from the trunk permits relay 5 of the transmission selector to restore and reverse battery over the incoming toll trunk. Polarized relay 1 of the cord circuit operates and closes the circuit of the supervisory lamp at the switchboard to give the calling operator "line seizure" supervision.

When the operator desires to signal the called subscriber key K will be operated to the left, thereby applying ringing current to the toll trunk to operate relay 9 which is bridged across the trunk conductors in series with a condenser. Relay 9 completes an obvious circuit for relay 10 which operates, completes a holding circuit for relay 11 at contacts 34, and removes ground from the control conductor by opening contacts 38. Removal of ground from the control conductor permits relay 206 of the connector to restore and open the circuit of relay 208. Relay 208 releases and completes the ringing circuit which may be traced from the generator or battery, interrupter contacts, upper winding of ring-cut-off relay 206, contacts 254 and 267, and either contacts 274 or 275 and the associated wiper 285 or 288, depending on the wiper set used, line conductor 292 through the bell and condenser at the called substation, line conductor 291, wiper 287 or 290 of the connector, contacts 283 or 284, lower contacts of relay 210 and contacts 262 to ground. The bell at the called substation rings intermittently.

When the called subscriber answers a direct current bridge is closed at the substation and relay 206 operates. Relay 206 locks to ground on the control conductor which is grounded as soon as the operator restores the ringing key. Relay 206 also completes the circuit of relay 208 which operates to open the ringing circuit and contacts 254 and 262 and complete the connection between the control loop and the called subscriber's line at contacts 256 and 261.

Relay 7 of selector TS operates over the called subscriber's loop and completes the circuit of relay 8. Relay 8 operates, disconnects relay 11 from the toll trunk, and completes a local circuit for maintaining the relay operated. The disconnection of relay 11 from the trunk permits relay 1 of the cord circuit to restore and extinguish the supervisory lamp, thereby giving the operator "answering" supervision. The operator may then switch the calling party into the connection in the usual way and disconnect her own telephone set therefrom.

When the called subscriber hangs up at the termination of the call, relays 7 and 8 restore and relay 11 is again connected to the toll trunk. Relay 1 of the cord reoperates and completes the circuit of the supervisory lamp to give the usual "disconnect" supervision. The operator may then release the switches involved in the connection by withdrawing the plug from the jack.

*Release*

The called subscriber controls the release of the connection, that is, the operator is not able to release the same by withdrawing the plug of the calling cord from the jack until the subscriber hangs up. This is due to the fact that the called subscriber maintains relays 7 and 8 energized. Relay 8 maintains the holding circuit for relay 11 which in turn maintains the circuit of relay 12 and prevents the switches from releasing.

When the called subscriber hangs up at the termination of a call, relay 7 releases and opens the circuit of relay 8. Relay 8 releases and reconnects relay 11 to the trunk, thereby placing the latter relay under control of the calling operator. The operator may then release the connection by withdrawing the plug of the calling cord from the jack. The circuit of relay 11 is opened and the relay restores and opens the circuit of relay 12. Relay 12 restores and completes the circuit of the release magnet RLM by way of contacts 41, 43, 51, and the vertical off-normal contacts. The release magnet restores the switch wipers to normal position in the usual manner. The opening of contacts 44 and 45 upon the release of relay 12 permits relay 14 to restore. The return of the switch wipers to normal position results in the operation of the various vertical off-normal spring contacts. Contacts 15 open the circuit of relay 6 which restores and contacts 16 reconnect the upper winding of relay 11 to the trunk line.

The removal of ground from release-trunk conductor 64 due to the release of switch TS permits relay 75 of selector IS to restore and complete the circuit of release magnet RLM. The release magnet restores the switch wipers to normal position in the usual manner and upon their return thereto the release magnet circuit is opened at off-normal contacts 68. The closure of off-normal contacts 69 reconnects the upper winding of relay 74 to the release-trunk conductor.

The removal of ground from release-trunk conductor 219 upon the release of the preceding switches permits relay 201 to restore and open the circuit of relays 202 and 204 at contacts 225. These relays accordingly restore and at their lower contacts complete a circuit for release magnet RLM by way of off-normal contacts 213. Relay 204 removes ground from the local holding circuit, thereby permitting relay 210 to restore. The removal of ground from the control conductor, upon the release of the switch TS, permits relay 206 to restore. When the switch wipers reach normal position the various off-normal contacts operate, contacts 213 open the release magnet circuit and contacts 215 open the holding circuit of relays 209 and 211. The switches are thus returned to normal position and are in readiness to respond to the next call.

*Supervisory signals*

Returning now to the point in the connection at which connector C connects with the called line, the operation of relay 201, as stated, disconnects impulse relay 203 from the trunk conductors and connects relay 204 in series with the lower winding of relay 202. Relay 203 restores and at contacts 237 opens the original energizing circuit of relay 204. Relay 204 is now energized in series with the lower winding of relay 202 and ground at its own upper contacts. Relay 204 maintains the holding circuit of relay 210 and maintains ground on release trunk conductor 296 to mark the connector busy to local selectors. In addition to the foregoing, relay 204 maintains one open point in the circuit of the supervisory lamp L2 at contacts 241 to prevent the lamp from lighting to give a false supervisory signal. Relay 202 maintains an open point in the circuit of supervisory lamp L1 at contacts 230 to prevent that lamp from lighting and giving a false supervisory signal. In local connections, relay 204 is released and relay 202 remains operated when the calling subscriber hangs up first. This results in the closure of the circuit of lamp L2. The called party on hanging up first releases relay 202 while relay 204 remains operated and completes the circuit of lamp L1.

*Toll call to a party line*

The operations involved in extending a toll call to a party line will be described in connection with a call to substations T1 and T2 (Fig. 3). The operator connects the calling end of a cord with a trunk extending to an idle toll transmission selector for example, the selector TS and dials the first two digits of the number with exactly the same results as described for the previous connection. In this case, however, the intermediate selector will be operated to a level in which trunks extending to the party-line connector are accessible. It may be assumed that the trunk comprising conductors 315—318 is the trunk selected. Ground is extended over release trunk conductor 317 and control conductor 316 as in the previous case, and the control loop is extended over talking conductors 315 and 318 as before. The ground on the release trunk conductor by way of the busy key contacts and the vertical off-normal contacts operates relay 310. Relay 310 prepares a holding circuit for itself at contacts 365, completes the impulsing circuit to vertical magnet VM at contacts 366, and opens a point in the circuit of ring-cut-off relay 307 at contacts 368. The ground on the release trunk also permits impulse relay 303 to operate over the calling loop and complete an obvious circuit for relay 304. Relay 304 operates and supplies ground to the local holding circuit at its upper contacts, applies ground directly to the lower winding of relay 303 at contacts 333, prepares the impulsing circuit at contacts 334, and opens the release magnet circuit at its lower contacts. The dialled impulses are repeated by the toll transmission selector in the usual way and relay 303 follows the impulses and repeats them by way of its lower contacts, contacts 334, lower contacts of relay 305, contacts 381, 363, and 366, winding of vertical magnet to battery. The vertical magnet raises the wipers step-by-step to the called level. Relay 306 which is connected in parallel with the vertical magnet operates on the first impulse and, due to its slow-releasing characteristics, remains operated throughout the series of impulses. The off-normal springs operate on the first step of the wipers and among other things, open the original energizing circuit of relay 310. Relay 310, however, remains operated throughout the series of impulses over a circuit including contacts 365, 361, and 342 to ground on the local holding conductor.

Shortly after the last impulse of the series, relay 306 releases, opens the previously completed holding circuit of relay 310 and completes a circuit for relay 310 and the upper winding of relay 309 in series by way of contacts 353 and 341. Relay 310 remains energized and relay 309 energizes in this circuit, the latter relay transferring the previously traced impulse circuit to rotary magnet RM by way of contacts 362.

The operator now transmits the fourth series of impulses which are repeated by the transmission selector to impulse relay 303. Relay 303 repeats the impulses to rotary magnet RM which rotates the wipers of the switch step-by-step to the contact position in which the called line is accessible. Relay 306 operates in parallel with the rotary magnet, opens the circuit over which relays 309 and 310 were being held operated at contacts 341, and completes a holding circuit for the lower winding of relay 309 alone at contacts 342. Relay 310 restores and prepares the circuit of the stepping magnet SM of the auxiliary switch. Relay 309 remains energized throughout the series of impulses. The release of relay 310 completes an operating circuit for relay 307 from the grounded control conductor and contacts 345 and 368. Relay 307 completes an obvious locking circuit for itself, opens a point in the circuit over which relays 309 and 310 were previously energized, and opens the ringing circuit.

Shortly after the last impulse of the series, relay 306 restores and opens the holding circuit of the lower winding of relay 309. Relay 309 restores and transfers the impulsing circuit by way of contacts 363 and 367 to stepping magnet SM of the auxiliary switch. The value of the final digit of the number will depend both upon the particular one of the two lines accessible in the bank position to which the switch wipers have been set and on the particular party of the called line with which a connection is desired. For example the party 1 on the line accessible to the upper set of wipers will be called by the digit 1 while the party 1 on the line accessible to the lower set of wipers will be called by the digit 6. It will be assumed in the present case that the digit 2 is dialled, indicating a call for the subscriber at station T2. The impulses are repeated as in the previous instances and stepping magnet SM advances wipers 391 and 392 of the auxiliary switch to the second set of contacts in the switch banks. Relay 306 operates in parallel with the stepping magnet and prepares the test circuit at contacts 343. At the end of the series of impulses and before relay 306 has had time to restore, the called line is tested for its busy or idle condition over a circuit which may be traced from test wiper 386, upper winding of relay 312, contact and wiper 392 of the auxiliary switch, contacts 343, resistance 313, winding of relay 305 to battery. In case the called line is busy there will be a ground on the test contact and relay 305 will operate in its first step closing only contacts 338. When relay 306 releases after a slight delay, a circuit will be completed independent of resistance 313 to operate relay 305 completely. Relay 305 closes the busy signalling circuit at its upper contacts, completes a circuit for relay 301 at contacts 336, completes its own locking circuit at contacts 339, and opens the impulsing circuit of its lower contacts. The calling operator is given a busy signal due to the intermittent connection of ground to the upper trunk conductor by way of contacts 350, upper contacts of relay 305 and contacts 323.

In case the last digit of the number is 7 for example, instead of 2, as explained previously, the test circuit will be completed over the seventh contact engaged by wiper 392, the upper winding of relay 311 and test wiper 383. The operation of the busy relay 305 will be exactly the same as in the prior connection in case the line is busy.

In the case of a call to an idle line, the test relay does not operate in either of the test circuits previously described, and, when relay 306 releases shortly after the last impulse of the series, a circuit is completed for the upper winding of the switch through relay 311 or 312. In case relay 312 is included in the circuit as will be the case for a number ending in the digit 2, this relay operates and completes the ring-back-tone circuit at its upper contacts, connects up wipers 382 and 384 at contacts 374 and its lower contacts, completes a circuit for relay 301 at contacts 375, prepares the circuit for supervisory lamp L1 at contacts 376, completes the pick-up circuit at contacts 377, applies direct ground to the test wiper at contacts 379, completes a locking circuit for itself at contacts 380, and opens the impulsing circuit at contacts 381.

At this point it may be noted that the pick-up circuit above-mentioned is provided to control the start of ringing. In case the ringing used for signalling purposes is of the so-called code type, that is, consists of various codes of ringing current of a single frequency, it is necessary to prevent ringing current from being applied to the line until the interrupter is at the beginning of a code. This arrangement is well-known and pick-up conductor 378 in this case would be connected to the pick-up conductor of the code interrupter. In the case of a toll call, however, the pick-up circuit is not effective since it is open at contacts 352. Accordingly, no ringing will take place until the operator exchanges the usual ringing control and the code interrupter is in the proper position.

In the case of a system using harmonic ringing, that is, a different frequency for signalling each of the parties on the line, the pick-up circuit above described is not necessary. Relay 310 must be operated, however, and in this case the contact spring of relay 312 is connected directly to ground instead of to the pick-up conductor 378. This arrangement makes it possible to use the same connector for either code or harmonic ringing with a very simple change consisting of the switching of the connection to one spring of relay 312.

Assuming that the last digit of the called number was the digit 7, the following operation is had in case the called line is idle. The test circuit, as previously explained, will include the seventh contact of wiper 392 of the auxiliary switch, upper winding of relay 311 and test wiper 383. When the line is idle, relay 305 does not operate and after relay 306 releases the circuit is completed for operating relay 311. Relay 311 connects up line wipers 385 and 387 at contacts 369 and 373, applies ground directly to test wiper 383 at contacts 370, and completes a locking circuit for itself and an energizing circuit for relay 312 at contacts 372. Relay 312, accordingly, operates and closes the various circuits described for its operation in the previous instance.

Upon the connector establishing a connection with a called line, as described in any of the above instances, a circuit is completed for relay 301 and that relay operates to disconnect impulse relay 303 from the trunk and to short-circuit the talking condenser of the switch. The lower winding of relay 302 is connected in series with relay 304 at contacts 325. The disconnection of the impulse relay of the trunk permits the restoration of supervisory relay 5 of the transmission selector and line seizure supervision is returned to the calling operator in the usual way. Relay 303 of the connector restores and opens the original energizing circuit of relay 304. Relay 304 remains energized in series with the lower winding of relay 302 and the latter relay also operates. Relay 304 maintains ground on the various holding circuits and maintains an open point in the circuit of supervisory lamp L2 to prevent a false supervisory signal. Relay 302 opens a point in the circuit of supervisory lamp L1 to prevent this lamp from giving a false supervisory signal.

The calling operator initiates the ringing, as previously explained, by removing ground from the control conductor at the transmission selector, which permits relay 307 of the connector to restore. Relay 307 completes the pick-up circuit at contacts 352 and relay 310 operates at the proper time to complete the ringing circuit. Ringing current is now applied from the selected generator lead 61—65, wiper 391 of the auxiliary switch, and in the case of an odd digit, over the resistance, lower contacts of relays 310, 308, and 307, contacts 373 or the lower contacts of relays 311 and 312, wiper 387 or 384, over one side of the called line through the bell and condenser at the substation, back over the other side of the lines and either wiper 382 or 385, contacts 369 or the upper contacts of relay 311 and contacts 374, contacts 346 and 355, and upper winding of relay 307 to battery. In case the last digit of the called number is an even digit, the ringing current will be applied over the lower contacts of relay 306, contacts 358, winding of relay 308 to battery. This ringing current on which ground is superimposed energizes relay 308. Relay 308 locks to ground on the local holding conductor and transfers the ringing circuit by way of contacts 357, resistance, lower contacts of relay 310, contacts 356 and 346, and by way of contacts 369 or the upper contacts of relay 311 and contacts 374 to wiper 382 or 385 of the connector and thence over the called line. The return circuit for the ringing current includes one of the lower wipers of the connector, lower contacts of relays 311 and 312 or contacts 373, lower contacts of relay 307, contacts 359, upper winding of relay 307 to battery. It will thus be seen that the positioning of the auxiliary switch accomplishes four different functions, namely the selection of the particular ringing current to be used, the selection of the set of wipers to be used, the selection of the side of the line to which the ringing current is to be applied, and the closure of the circuit of one or the other of the switch through relays.

When the called subscriber answers a direct current bridge is closed at the called substation and relay 307 operates. Relay 307 opens the ringing circuit at contacts 346 and its lower contacts, and extends the calling loop through by way of contacts 347 and 354 to the battery-feed bridge at the transmission selector. The battery-feed relay operates as previously described and gives the operator "Answering" supervision.

The release of the connection is the same as for the previously described connection to an individual and is initiated by the called subscriber restoring his receiver and the operator withdrawing the plug of the calling cord from the jack. The removal of ground from the release trunk and holding conductors permits relays 301 and 307 to restore. Relay 301 opens the circuit of relays 302 and 304 and these relays restore. Relay 304 opens the circuit of relays 308 and 311 and the latter opens the circuit of relay 312 and these relays restore. The circuits for release magnet RLM of the connector and release magnet ARM of the auxiliary switch are closed by way of the lower contacts of the relays 302 and 304 and the respective off-normal contacts. These magnets restore the wipers to normal position in the usual manner, and the switches are ready to respond to the next call.

*Local calls*

The operation of the connector switches in local calls is generally the same as in toll calls except for the differences to be pointed out hereinafter. When a connection is extended to connector C (Fig. 2), for example, by a local selector which has access thereto over the trunk comprising conductors 294—296 the connector operates as follows: Ground is fed ahead over release trunk conductor 296 and energizes relay 208. This ground also permits relay 203 to operate over the calling loop and complete a circuit for relay 204. Relay 204 returns the ground on the release trunk conductor to hold up the preceding switches and this ground by way of the contacts of the busy key BK and the vertical off-normal contacts marks the connector busy to the toll selectors.

The response of the switch to the dialled impulses is exactly the same as for a toll connection and will not be described in detail. It should be noted, however, that relay 206 is not operated during the vertical movement of the switch since there is no circuit over control conductor 220. On the first vertical step of the wipers off-normal contacts 212 separate toll release trunk conductor 219 from local release conductor 296. The connector is still busy as far as the toll selectors are concerned since low impedance relay 208 and its battery connection has been disconnected and the switching relays of the toll selector are unable to operate and stop a selector on the trunk leading to this switch.

The called line is tested in the same manner as for a toll call and if the line is busy relay 205 operates and locks and connects the busy tone to the upper talking conductor by way of contacts 246 and the upper contacts of relay 205. Since the toll and local release trunk conductors have been separated, as above described, and since there is no ground connection to conductor 219, there will be no circuit for relay 201 and, accordingly, that relay does not operate as it did in a toll connection. Impulse relay 203 remains operated over the loop of the calling line and maintains the connector in operated condition. In the meantime the subscriber is given the busy tone to indicate that a connection with the wanted line is impossible, and the subscriber is expected to hang up and release the connection.

In case the called line is idle when a connection is extended thereto, relay 201 operates, as previously explained for a toll connection, and completes the ringing circuit since relay 206 will be normal. The ringing current is intermittently transmitted over the line immediately after its seizure and with no further control from the calling subscriber. When the called subscriber answers, relay 206 operates over the called subscriber's loop and at its lower contacts completes a circuit for relay 208. Relay 208 operates and opens the ringing circuit at contacts 254 and 262 and at contacts 256 and 261 extends the called line through to battery-feed relay 202. Relay 202 operates and reverses the connection of relay 203 with respect to the trunk conductors. Relay 202 also opens the circuit of supervisory lamp L1, closes a point in the circuit of supervisory lamp L2 and opens a point in the circuit of the release magnet.

At the termination of a call, one or both of the subscribers hang up and in the latter case the entire connection is released. In case the called subscriber hangs up first, relay 202 restores and at contacts 230 completes a circuit for supervisory lamp L1. Relay 203, however, remains energized over the calling line and prevents the release of the connector. Lamp L1 glows to notify the exchange attendant that a connector is being held by a calling subscriber after the called subscriber has hung up. When the calling subscriber finally hangs up, relay 203 releases and opens the circuit of relay 204. Relay 204 removes ground from the release trunk conductor and from the local holding conductor and closes the circuit of the release magnet. The release magnet operates to restore the switch wipers to normal in the usual manner and the various relays of the connector restore to normal.

In case the calling subscriber hangs up first, relays 203 and 204 will release and relay 202 will remain energized over the loop of the called subscriber. Relay 204 removes ground from the local holding circuit and from the release-trunk conductor of the local trunk. Relay 202 maintains the ground on the local holding circuit and its own lower winding by way of contacts 269, 246, and 231. In addition, relay 202 opens the circuit of lamp L1 at contacts 230, closes the circuit of supervisory lamp L2 at contacts 236, and opens a point in the circuit of the release magnet. The removal of ground from the local release trunk conductor permits the preceding switches to release. The local trunk, however, cannot be seized in a new connection, due to the fact that relay 208 and its associated battery is not connected to the trunk, as off-normal contacts 214 are open. Lamp L2 glows to notify the exchange attendant that a connector is being held by a called subscriber who has failed to hang up after the calling subscriber has withdrawn from the connection. When the called subscriber finally hangs up, relay 202 releases and opens the holding circuit of the various operated relays and completes the circuit of the release magnet. The release magnet operates to restore the switch wipers to normal position in the usual manner.

It may be noted that during a connection with either a busy line or an idle line, relay 201 will be connected to test conductor 219 of the toll trunk. Relay 201 is a high-resistance relay and does not energize the test relay of a selector sufficiently to stop a switch on the trunk and, consequently, toll selectors will pass over this trunk. Relay 201 is somewhat slow to operate and the momentary application of ground to conductor 219, as a toll selector tests the trunk, does not operate the relay. However, a slight operation will be of no consequence since the selector will immediately pass by the trunk and restore the relay to normal condition.

The extension of a local connection over connector C1 (Fig. 3) is exactly the same as for a toll connection except for the differences due to the absence of ground on the toll-test and control conductors. These differences were fully explained in connection with the individual line connector and need not be repeated. It is sufficient to note that relay 307 does not operate until the called subscriber answers and that relay 301 does not operate at any time during the connection. Relay 303 feeds talking battery to the calling subscriber, relay 302 feeds talking battery to the called subscriber. These two battery-feed relays jointly control the release of the connector. The release is exactly the same as described for the connector C.

*All-trunks busy metering*

Figure 1:
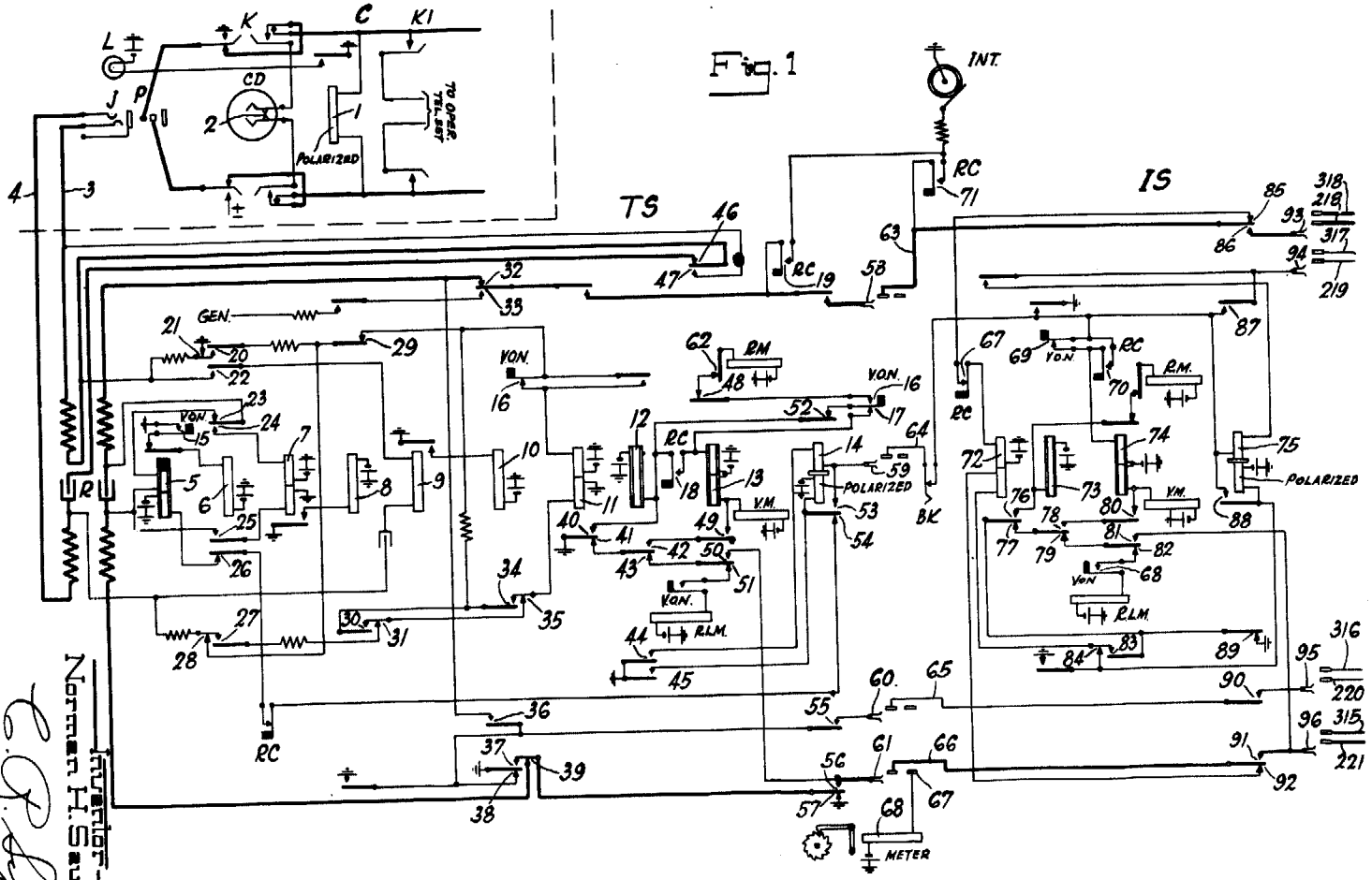
Fig. 1 shows a toll operator's cord circuit C, a toll-transmission selector TS, and a toll-intermediate selector IS.

In the preceding examples it is assumed in each case that the selector found an idle trunk in the called group. The operation resulting from the failure to find an idle trunk will now be described. Assuming first that selector TS (Fig. 1) has been operated to a level in which all trunks are busy, the selector will rotate, as described in previous connections. In this case since no idle trunks are available, the wipers will be stepped to the eleventh position. A set of contacts are provided in this position to which no trunk is connected. The contact accessible to the lower wiper, however, is connected to an overflow or all-trunks busy meter. When the wiper reaches the eleventh position the eleventh-position cam contact designated RC operates with the results that the circuit of relay 5 is opened and the interrupter INT is connected to the upper talking conductor of the switch. Relay 5 restores and completes a circuit for relay 6. Relay 6 reverses a battery and ground connections to the toll-trunk and connects up battery-feed relay 7. The ground intermittently applied to the upper talking conductor of the switch by the interrupter operates relay 7 intermittently and this relay operates relay 8 which periodically opens the trunk as explained for attempted toll calls to busy lines. The supervisory lamp at the operator's position is flashed to give the all-trunk busy signal. A further result of the operation of the eleven-position cam contact is the connection of the upper winding of relay 13 in parallel with release relay 12 and relay 13 operates. After noting the busy signal the operator will release the connection by withdrawing the plug P from the jack J thereby opening the circuit of relay 11. Relay 11 opens the circuit of relays 12 and 13 and a new circuit is closed for the lower winding of relay 13 over contacts 41, 42, and 49. Relay 12 restores after a slight delay and opens the second circuit of relay 13 which relay, however, remains operated for a short interval after the release of relay 12. During this interval ground is applied by way of contacts 41, 43, and 50, wiper 61, contacts 67, through the winding of meter 68 to battery. The meter operates to register the attempted call to a group in which all trunks are busy. The meter incidentally may serve a number of groups or may be individual to one particular group, the operation in any case being as described. When relay 13 finally restores, a circuit for the release magnet RLM is completed and the magnet returns the switch wipers to normal position.

The operations resulting from intermediate selector IS encountering a group in which all trunks are busy is substantially the same as that described for the transmission selector. In this case a circuit is completed through the upper winding of relay 74 to the grounded release trunk conductor. Upon the opening of the control loop from the transmission selector which takes place when the operator disconnects the calling plug from the trunk, relays 72 and 73 restore. During the time required for relay 73 to restore a new circuit is completed for the lower winding of relay 74 which accordingly remains energized a short time after relay 73 restores. Upon the restoration of relay 73 a metering circuit is completed by way of contacts 89, 77, 79, 81, wiper 96 and the eleventh-position contact engaged thereby, to the meter connected to the contact, which will correspond to the meter shown in connection with the transmission selector. Relay 74 restores after a short interval and completes the circuit for the release magnet RLM which returns the selector to normal in the usual manner.

What is claimed is:

1. In an automatic switch having access to a plurality of groups of trunks, a switching relay having a polarizing winding and an operating winding, means for energizing said operating winding responsive to the switch being taken into use to prepare the relay for operation, means responsive to directive control for positioning the switch in selective relation with any one of said trunk groups, means for automatically operating the switch to hunt over the trunks of a selected group, means for energizing said operating winding to operate the relay responsive to the switch finding an idle trunk in the group hunted over, and means controlled by said relay for interrupting the automatic operation and for effecting the seizure of the idle trunk.

2. An automatic switch as claimed in claim 1 in which the switching relay on operating disables its operating winding and completes a circuit for maintaining itself operated over its polarizing winding.

3. An automatic switch as claimed in claim 1 in which a test wiper is connected to the operating winding of the switching relay during the automatic hunting operation and in which the connection of the test wiper is transferred to the polarizing winding of the switching relay upon the operation of the relay.

4. In a telephone system, a selector switch, a test wiper for the switch, test contacts accessible to the wiper, said contacts being characterized under different conditions by a connection to battery through a low resistance, a connection to battery through a high resistance, a connection to ground, or the absence of potential, a polarized relay for the switch, means for operating the switch to cause said wiper to engage said contacts successively, means responsive only to the wiper engaging a contact to which battery is connected through a low resistance for operating said relay, and means controlled by said relay for stopping the switch.

5. In a telephone system, an automatic switch, a trunk including two talking conductors and a test conductor terminating in the switch, a double-wound changeover relay for the switch, primary and secondary magnets for the switch, means for extending a connection to the switch via said trunk, means responsive to said connection for operating said relay over a circuit including one winding of the relay and said test conductor, means controlled by said relay when operated for connecting up the primary magnet, means controlled over the talking conductors of the trunk for operating said primary magnet to set the switch, means for opening the operating circuit of said relay at the beginning of the primary operation of the switch, means for completing a holding circuit including the other winding of the relay during the primary operation of the switch, means for opening said holding circuit to release the relay upon the completion of said primary movement, and means controlled by said relay on releasing for disconnecting the primary magnet and for connecting up the secondary magnet.

6. In a telephone system, a toll selector, talking and test wipers for the selector, a line relay, a release relay and a changeover relay for the selector, means for operating said relays responsive to the seizure of the selector, a group of trunks, means for operating the selector into selective relation with the trunk group, means for releasing said changeover relay to cause the selector to hunt for an idle trunk in the group, means responsive to the failure of the selector to find an idle trunk in the group for re-operating said changeover relay and for extending a connection via one of said talking wipers, means for releasing said relays in succession, means responsive to the release of the line and release relays for closing a circuit over said connection, and means responsive to the release of said changeover relay for opening said circuit and for releasing the selector.

7. A telephone system as claimed in claim 6 in which the changeover relay is reoperated due to the closure of contacts adapted to be closed mechanically when the wipers of the selector are moved beyond the position in which the last trunk of a group is accessible.

8. In an automatic switch, incoming conductors including two talking conductors and a test conductor, a double wound line relay, circuit connections connecting a source of current and one winding of the relay in series to one of said talking conductors, and other circuit connections connecting the other winding in bridge of the other of said talking conductors and said test conductor.

9. An automatic switch as claimed in claim 8 in which the connection between the relay winding and the test conductor is opened when the switch is caused to leave its normal position.

10. An automatic switch as claimed in claim 8 in which the circuit connections between the relay windings and the two talking conductors include reversing contacts of a second relay.

11. In a telephone system, lines, an automatic switch, means for operating the switch to connect with a desired one of said lines, a test wiper for the switch, test and switching relays in the switch adapted, respectively, to give a calling party a busy signal and to complete a connection to a line, and means for temporarily connecting the wiper and said relays in series to render the relays effective.

12. In an automatic switch, means for responding to a plurality of series of impulses to select a called line, talking and test wipers, a test relay for determining the idle or busy condition of a call line, a switching relay for connecting up the talking wipers to complete a connection to an idle called line, and means responsive to the last series of impulses received by the switch for temporarily connecting said test wiper and said relays in series.

13. An automatic switch as claimed in claim 12 in which the series connection of the test wiper and the two relays is completed immediately after the first impulse of the last impulse series and is maintained for an interval after the last impulse of the series whose length is dependent upon the releasing time of a slow-releasing relay.

14. In a telephone system, a connector switch, means for extending connections of two classes over the switch, a release relay and a battery-feed relay for the switch, supervisory signals, means for energizing and deenergizing said relays in separate circuit to control said signals in connections of one class, and means for energizing said relays in the same circuit to disable said signals in connections of the other class.

15. In an automatic switch, two sets of wipers, a double wound differential relay, means for setting the switch, means for operating said relay over one winding to connect up one set of wipers responsive to the completion of the setting of the switch, and means controlled at will for energizing the other winding of said relay to restore the same and connect up the other set of wipers.

16. In an automatic switch equipped with two sets of wipers and adapted to respond to three series of impulses, a normally open test circuit adapted to operate with either set of wipers, two relays, means for positioning the wipers responsive to the first two series of impulses received, means for operating one of said relays to render one set of wipers effective responsive to the completion of the second series of impulses, means for operating the other of said relays to complete said test circuit responsive to the first impulse of the third series, and means for deenergizing said one relay to render the other set of wipers effective responsive to the second impulse of the third series.

17. In an automatic switch equipped with two sets of wipers, a wiper switching relay, a second relay, an impulsing circuit, an operating magnet connected to said circuit, means for operating said first relay to switch wipers and to switch the impulsing circuit from said magnet to said second relay, means for operating said second relay over said impulsing circuit, and means controlled by said second relay for switching the impulsing circuit from itself to said first relay.

18. In an automatic switch equipped with two sets of wipers, means for responding to two series of impulses to set the wipers on contacts of two different lines, means for responding to a third series of impulses to select a set of wipers, and means for rendering the switch effective for testing for the busy or idle condition of a line immediately after one impulse of the third series has been received.

19. In a telephone system, a connector switch and an associated auxiliary switch, primary and secondary magnets for the connector, a stepping magnet for the auxiliary switch, two changeover relays, means for operating the first relay responsive to the seizure of the connector, circuit connections controlled by the first relay for connecting up said primary magnet, means for operating the primary magnet to partially set the connector, means for operating both relays in series responsive to the completion of said partial setting, circuit connections controlled by the second relay for connecting up said secondary magnet, means for operating the secondary magnet to complete the setting of the connector, means for releasing both of said relays responsive to the completion of the setting of the connector, and circuit connections controlled by said relays jointly for connecting up said stepping magnet.

20. In a telephone system, a connector having a plurality of sets of wipers, a switching relay for each set of wipers, lines accessible to said wipers, an auxiliary switch individual to said wipers, a plurality of sources of ringing current, means for operating the connector to position the wipers on certain of said lines, means for thereafter operating said auxiliary switch, and means controlled by said auxiliary switch for selecting a particular one of said current sources, for determining the side of the line to which the selected current source is to be connected, and for rendering only one of said switching relays operative to test the line engaged by its associated set of wipers.

21. In a telephone system, a selector switch having a fixed contact set and a movable contact set adapted to engage said fixed contact set, each of said contact sets including two line contacts and a control contact; a line including two line conductors and a control conductor terminating at the respective contacts in said fixed contact set; another selector switch connected to said line and including a relay operative to initiate operation of said other selector switch; an operating circuit for said relay including one terminal of a source of supply derived in said other selector switch, a winding of said relay, one of said line conductors, one of said fixed line contacts, a loop extending between said movable line contacts, the other of said fixed line contacts, the other of said line conductors, a connection extending between said other line conductor and said control conductor, said control conductor, said fixed control contact, said movable control contact, and the other terminal of the source of supply derived in said first-mentioned selector switch, whereby no potential difference is present between said fixed line contacts when said other selector switch occupies an idle position; and means for causing said movable contact set to engage said fixed contact set, thereby to complete said operating circuit.

22. In a telephone system, a line including two line conductors and a control conductor; a selector switch having access to said line; another selector switch connected to said line and including a relay having a winding and being operative to initiate operation of said other selector switch; an operating circuit for said relay including one terminal of a source of supply, a connection between said one supply terminal and one terminal of said winding, a connection between the other terminal of said winding and one of said line conductors, a loop including said first-mentioned selector switch and extending between said one line conductor and the other of said line conductors, a connection between said other line conductor and said control conductor in said other selector switch, and a connection between said control conductor and the other terminal of the source of supply derived in said first-mentioned selector switch, whereby no potential difference is present between said line conductors when said other selector switch occupies an idle position; and means for causing said first-mentioned selector switch to seize said line, thereby to complete said operating circuit.

23. In a telephone system, a line including two line conductors and a control conductor; a selector switch having access to said line; another selector switch connected to said line and including a relay having a winding and being operative to initiate operation of said other selector switch; an operating circuit for said relay including one terminal of a source of supply, a connection between said one supply terminal and one terminal of said winding, a connection between the other terminal of said winding and one of said line conductors, a loop including said first-mentioned selector switch and extending between said one line conductor and the other of said line conductors, a connection between said other line conductor and said control conductor in said other selector switch, and a connection between said control conductor and the other terminal of the source of supply derived in said first-mentioned selector switch, whereby no potential difference is present between said line conductors when said other selector switch occupies an idle position; and means for causing said first-mentioned selector switch to seize said line, thereby to complete said operating circuit; and means responsive to the operation of said relay for connecting the other terminal of the source of supply derived in said other selector switch to said control conductor.

24. In a telephone system, a first line, a selector switch having access to said first line, a second line, another selector switch connected to said first line and including a relay operative to initiate operation of said other selector switch, said other selector switch including a mechanism having an idle position and operative to select said second line, an operating circuit and a holding circuit for said relay, means for causing said first-mentioned selector switch to seize said first line, means responsive to the seizure of said first line for completing said operating circuit, means responsive to the operation of said relay for completing said holding circuit, means for causing a predetermined operation of said mechanism, and means responsive to said predetermined operation of said mechanism for interrupting said operating circuit.

25. In a telephone system, a first line, a first selector switch having access to said first line, a second line, a second selector switch connected to said first line and including a relay operative to initiate operation of said second selector switch, said second selector switch including a mechanism having an idle position and operative to select said second line, an operating circuit for said relay, means for causing said first selector switch to seize said first line, means responsive to the seizure of said first line for completing said operating circuit, means for interrupting said operating circuit, thereby to cause said relay to restore to release said second selector switch, means responsive to the restoration of said relay for causing a predetermined operation of said mechanism, means responsive to said predetermined operation of said mechanism for interrupting a further point in said operating circuit, and means for restoring said mechanism to its idle position.

26. In a telephone system, a first line, a selector switch having access to said first line, a second line, another selector switch connected to said first line and including a first relay and a second relay operative to initiate operation of said other selector switch, said other selector switch including a mechanism having an idle position and operative to select said second line, an operating circuit and a holding circuit for said first relay, means for causing said first-mentioned selector switch to seize said first line, means responsive to the seizure of said first line for completing said operating circuit, means responsive to the operation of said first relay for causing the operation of said second relay, means responsive to the operation of said second relay for completing said holding circuit, means for interrupting said operating and holding circuits, thereby to cause said first and second relays to restore to release said other selector switch, means responsive to the restoration of said first relay for causing a predetermined operation of said mechanism, means responsive to said predetermined operation of said mechanism for interrupting a further point in said operating circuit, and means responsive to the restoration of said second relay for interrupting a further point in said holding circuit and for restoring said mechanism to its idle position.

27. In combination, a switch having a bank of terminals, means for operating said switch to select an idle set of terminals in said bank, means effective upon selection of an idle set of terminals for connecting ground potential to the test terminal of the selected set of terminals, a relay individual to the selected set of terminals, and a grounded battery, one terminal of said selected set being normally connected through one winding of said relay to the non-grounded terminal of the battery, and another terminal of said selected set being normally connected through another winding of said relay to the test terminal of said set.

28. In combination in a switching system, a battery, a switch comprising a set of wipers and a bank of terminals, means for moving said wipers into engagement with any set of terminals in said bank, selectors, each of said selectors being connected to a different one of said sets of terminals, means associated with said switch and including the test wiper of said set of wipers for testing an engaged set of terminals and for seizing an idle set of terminals, a line relay for each of said selectors, one terminal of each of said sets of terminals being normally connected through one winding of the line relay of the associated selector to one pole of said battery, another terminal of each of said sets being normally connected to one end of another winding of the line relay of the associated selector, and the test terminal of each of said sets being normally connected to the other end of the said other winding of the line relay of the associated selector, and a circuit closed upon seizure of any of said sets of terminals by said switch for operating the line relay of the selector connected to the seized terminals, said circuit including said battery, both windings of said relay, the terminal to which said one winding of the line relay is normally connected and including said other terminal and the test terminal to which the other winding of the line relay is normally connected.

29. In a combination according to claim 28, circuit means in each of said selectors effective upon operation of the line relay for opening the normally closed connection including said other winding and the test terminal.

30. In a combination according to claim 28, circuit means in each of said selectors effective upon operation of the line relay for opening the normally closed connection including said other winding and the test terminal and for connecting the other pole of said battery to said other winding to hold said relay operated.

31. In a combination according to claim 28, circuit means in each of said selectors effective upon operation of the line relay for opening the normally closed connection including said other winding and the test terminal, and a circuit including said battery, both windings of said relay and both terminals of the set to which the selector is connected other than the test terminal for holding said line relay operated after the opening of the normally closed connection including said other winding and the test terminal.

32. In a combination according to claim 28, a high resistance element in each of said selectors, said element normally connecting said terminal of the battery to the test terminal of the set to which the selector is connected and also normally connecting said terminal of the battery to and through said other winding of the line relay to said other terminal of the set to which the selector is connected.

33. In combination in a switching system, a battery, a switch comprising a set of wipers and a bank of terminals, means for moving said wipers into engagement with any set of terminals in said bank, connectors, each of said connectors being connected to a different one of said sets of terminals, means associated with said switch and including the test wiper of said set of wipers for testing an engaged set of terminals and for seizing an idle set of terminals, a line relay for each of said connectors, one terminal of each of said sets of terminals being normally connected through one winding of the line relay of the associated connector to one pole of said battery, another terminal of each of said sets being normally connected to one end of another winding of the line relay of the associated connector, and the test terminal of each of said sets being normally connected to the other end of the said other winding of the line relay of the associated connector, and a circuit closed upon seizure of any of said sets of terminals by said switch for operating the line relay of the connector connected to the seized terminals, said circuit including said battery, both windings of said relay, the terminal to which said one winding of the line relay is normally connected and including the test terminal to which the other winding of the line relay is normally connected.

34. In a combination according to claim 33, circuit means in each of said connectors effective upon operation of the line relay for opening the normally closed connection including said other winding and the test terminal.

35. In a combination according to claim 33, circuit means in each of said connectors effective upon operation of the line relay for opening the normally closed connection including said other winding and the test terminal and for connecting the other pole of said battery to said other winding to hold said relay operated.

36. In a combination according to claim 33, circuit means in each of said connectors effective upon operation of the line relay for opening the normally closed connection including said other winding and the test terminal, and a circuit including said battery, both windings of said relay and both terminals of the set to which the connector is connected other than the test terminal for holding said line relay operated after the opening of the normally closed connection including said other winding and the test terminal.

37. In a combination in a switching system, a battery, a switch comprising a set of wipers and a bank of terminals, means for moving said wipers into engagement with any set of terminals in said bank, links, each of said links being connected to a different one of said sets of terminals, means associated with said switch and including the test wiper of said set of wipers for testing an engaged set of terminals and for seizing an idle set of terminals, a line relay for each of said links, one terminal of each of said sets of terminals being normally connected through one winding of the line relay of the associated link to one pole of said battery, another terminal of each of said sets being normally connected to one end of another winding of the line relay of the associated link, and the test terminal of each of said sets being normally connected to the other end of the said other winding of the line relay of the associated link, and a circuit closed upon seizure of any of said sets of terminals by said switch for operating the line relay of the link connected to the seized terminals, said circuit including said battery, both windings of said relay, the terminal to which said one winding of the line relay is normally connected and including the test terminal to which the other winding of the line relay is normally connected.

38. In a combination according to claim 37, circuit means in each of said links effective upon operation of the line relay for opening the normally closed connection between said other winding and the test terminal.

39. In a combination according to claim 37, circuit means in each of said links effective upon operation of the line relay for opening the normally closed connection between said other winding and the test terminal and for connecting the other pole of said battery to said other winding to hold said relay operated.

40. In a combination according to claim 37, circuit means in each of said links effective upon operation of the line relay for opening the normally closed connection between said other winding and the test terminal, and a circuit including said battery, both windings of said relay and both terminals of the set to which the link is connected other than the test terminal for holding said line relay operated after the opening of the normally closed connection between said other winding and the test terminal.

41. In a switching system, lines, means comprising a switch and a link for use in connecting calling and called lines, said switch comprising a bank of terminals and said link being connected to a set of terminals in said bank, means for connecting a calling line to said switch, means for operating said switch to test and seize the terminals to which said link is connected, a relay in said link, a circuit closed upon seizure of said link for operating said relay, said circuit including said calling line, the two line terminals and also the test terminal of said set of terminals, and a circuit closed responsive to the operation of said relay for holding said relay operated, said holding circuit including said calling line and the two line terminals but excluding the test terminal of said set of terminals.

NORMAN H. SAUNDERS.

Disclaimer

Re. No. 21,768.—*Norman H. Saunders*, Chicago, Ill. TELEPHONE SYSTEM. Patent dated Apr. 8, 1941. Disclaimer filed Sept. 8, 1950, by the assignee, *Automatic Electric Laboratories, Inc.*

Hereby enters this disclaimer to claim 5 of said patent.

[*Official Gazette October 3, 1950*]